United States Patent [19]
Letinski et al.

[11] Patent Number: 4,810,730
[45] Date of Patent: Mar. 7, 1989

[54] MOLDABLE POLYBENZIMIDAZOLE FILAMENTS AND PROCESS FOR PRODUCING MOLDED AND FOAMED PRODUCTS FROM THESE FILAMENTS

[75] Inventors: John S. Letinski, Metuchen; Gunilla E. Gillberg-LaForce, Summit, both of N.J.

[73] Assignee: Hoechst Celanese Corp., Somerville, N.J.

[21] Appl. No.: 47,250

[22] Filed: May 6, 1987

Related U.S. Application Data

[63] Continuation-in-part of Ser. No. 835,812, Mar. 3, 1986, Pat. No. 4,681,716.

[51] Int. Cl.⁴ ............... C08G 73/18; B29C 67/22; B29C 43/28
[52] U.S. Cl. .................. 521/184; 264/45.3; 264/53; 264/54; 264/143; 264/257; 264/331.12; 264/DIG. 9; 264/DIG. 64; 264/DIG. 66; 521/77; 521/189; 528/208; 528/342
[58] Field of Search ......... 264/53, 320, 184, DIG. 66, 264/45.3, 257, DIG. 64, DIG. 5, 54, 143, 331.12; 528/208, 342; 521/184, 77, 189

[56] References Cited

U.S. PATENT DOCUMENTS

| | | | |
|---|---|---|---|
| Re. 26,065 | 7/1966 | Marvel et al. | |
| 2,895,948 | 7/1959 | Brinker et al. | |
| 3,502,606 | 3/1970 | Conciatori et al. | |
| 3,509,108 | 4/1970 | Prince | 528/342 |
| 3,541,199 | 11/1970 | Bohrer et al. | 264/345 X |
| 3,549,603 | 12/1970 | Chenevey et al. | |
| 4,092,274 | 5/1978 | Fletcher et al. | |
| 4,263,245 | 4/1981 | Tan | 264/184 |
| 4,312,976 | 1/1982 | Choe | 528/179 |
| 4,452,971 | 6/1984 | Choe et al. | 528/336 |
| 4,452,972 | 6/1984 | Choe et al. | 528/336 |
| 4,483,977 | 11/1984 | Conciatori et al. | 528/342 |
| 4,485,232 | 11/1984 | Choe et al. | 528/207 |
| 4,588,808 | 5/1986 | Ward | 528/337 |
| 4,598,099 | 7/1986 | Trouw | 521/77 |
| 4,717,619 | 1/1988 | Letinski | 264/257 X |

FOREIGN PATENT DOCUMENTS 60-209034 10/1985 Japan .

OTHER PUBLICATIONS

Vogel, Herward and C. S. Marvel "Polybenzimidazoles, New Thermally Stable Polymers," in *Journal of Polymer Science*, vol. L., pp. 511-539 (1961).

*Primary Examiner*—Philip Anderson
*Attorney, Agent, or Firm*—Lynch, Cox, Gilman & Mahan

[57] ABSTRACT

This invention relates to a process for the production of high strength polybenzimidazole filaments and molded products made from such filaments. The filaments produced by this process contain from about 10 to about 50 percent by weight residual solvent and can be heated at a temperature of about 350° C. to about 600° C. to produce three-dimensional foamed articles.

43 Claims, 3 Drawing Sheets

MOLDABLE POLYBENZIMIDAZOLE FILAMENTS AND PROCESS FOR PRODUCING MOLDED AND FOAMED PRODUCTS FROM THESE FILAMENTS

CROSS REFERENCE TO RELATED APPLICATIONS

This is a continuation-in-part of co-pending application Ser. No. 06/835,812, filed Mar. 3, 1986, now U.S. Pat. No. 4,681,716.

BACKGROUND OF INVENTION

1. Field of Invention

This invention relates to a process for the production of polybenzimidazole filaments and fibers. More particularly, the invention relates to the production of moldable polybenzimidazole filaments and fibers.

2. Prior Art

Polybenzimidazole is a non-flammable polymer which may be formed into textile fibers having outstanding thermal, physical, and chemical stability. Processing parameters are well established for the extrusion of polybenzimidazole solutions into fibrous materials. Generally, polybenzimidazole fibers are produced by either dry or wet spinning. However, the prior art processes for the production of polybenzimidazole fibers do not produce products which are subsequently moldable. Usually, the prior art processes for preparing polybenzimidazole fibers include a washing step to remove the residual solvent in the fiber.

Commonly assigned U.S. Pat. No. 3,541,199 discloses a process for rendering polybenzimidazole fibers non-foamable so that they can be hot drawn without foaming or exploding. The patent states that sometimes after residual spinning solvent is removed by washing, polybenzimidazole fibers will explode or foam while being hot drawn. However, since according to the patent the residual solvent is removed from the fibers, the fibers are not readily moldable and, therefore, will not produce homogeneous composite articles.

In commonly assigned U.S. Pat. No. 4,598,099, a process for the production of polybenzimidazole foams is disclosed. The patent discloses that articles, such as fibers, can be prepared and foamed. However, the process requires the removal of residual solvent before foaming.

U.S. Pat. No. 4,092,274 discloses foamed, cross-liked polybenzimidazoles. However, the patent does not disclose the preparation of fibers that are moldable and can be foamed.

U.S. Pat. No. 4,263,245 discloses a process for producing high strength, ultra-low denier polybenzimidazole filaments. However, a washing step is included in which the polybenzimidazole solvent within the fiber is essentially removed so that less than about one percent by weight of the solvent is left in the final filament. The filaments produced by the process of this patent are not readily molded.

Accordingly, it is an object of the present invention to provide an improved process for the production of polybenzimidazole filaments.

It is also an object of the present invention to provide a commercially practical process for the production of polybenzimidazole filaments without diminution of the fiber's desired tensile properties.

It is a further object of the present invention to provide a process for the production of moldable polybenzimidazole filaments.

It is another object of this invention to produce polybenzimidazole based foams.

These and other objectives are obtained by preparing polybenzimidazole fibers according to the process of the instant invention.

SUMMARY OF INVENTION

Disclosed herein is a process for preparing molded, high-strength, polybenzimidazole articles. The process involves the steps of preparing a spinning solution containing about 10 to about 30 percent by weight of a polybenzimidazole polymer dissolved in a solvent, extruding fibers from the spinning solution in a vertically downward fashion into a gaseous atmosphere, collecting the resulting fibers, maintaining the fibers with a solvent content of about 10 to about 50 percent by weight based upon the total weight of the fiber plus solvent, and molding the resulting product. The resulting product can also be heated at a temperature in the range of about 350° C. to about 600° C. to form foamed, three-dimensional articles.

DETAILED DESCRIPTION OF INVENTION

DESCRIPTION OF THE DRAWINGS

The drawings are schematic representations of arrangements for carrying out the process of the present invention.

A. THE STARTING MATERIAL

Figure 1:
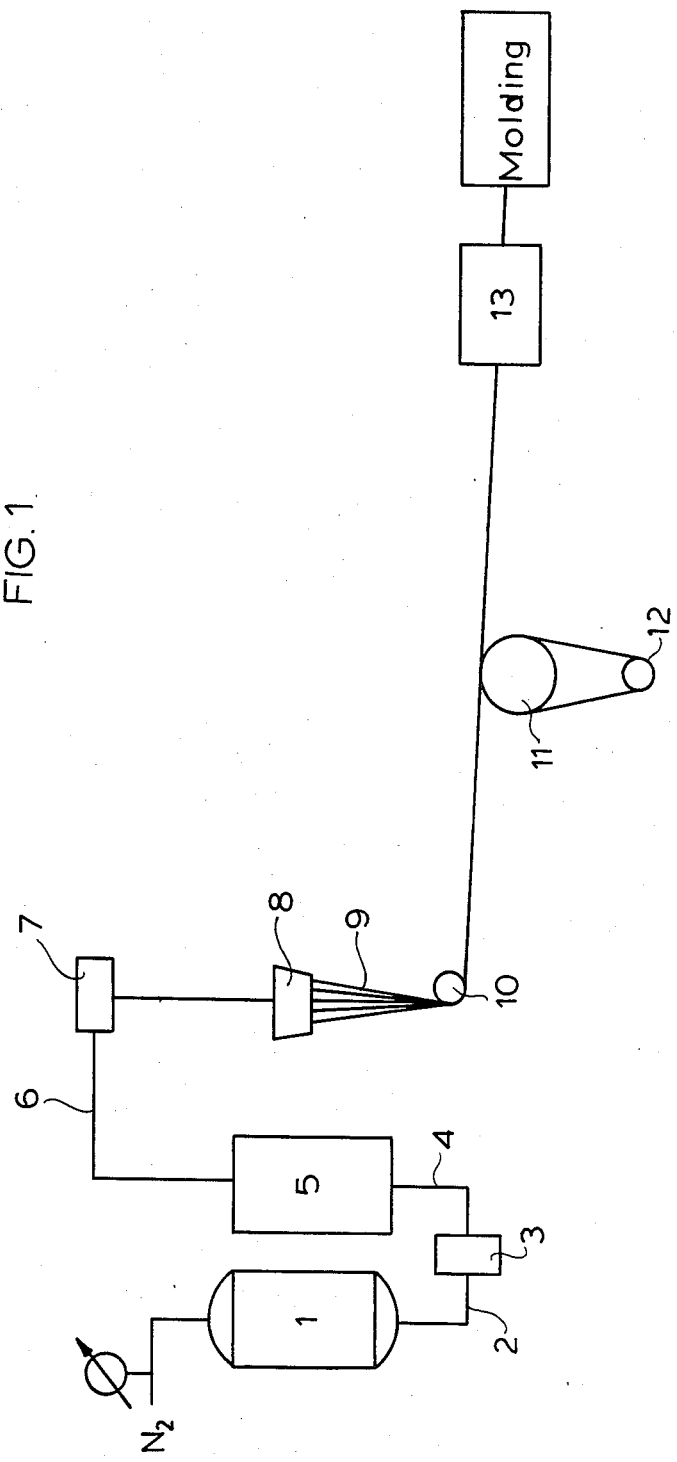
FIG. 1 is a schematic representation of the preferred embodiment for preparing moldable polybenzimidazole fibers.

The polymeric material used to form the filaments of the present invention is a linear polybenzimidazole. Polybenzimidazoles are a known class of heterocyclic polymers. Typical polymers of this class and their preparation are more fully described in U.S. Pat. No. 2,895,948, U.S. Pat. No. Re. 26,065, and in the Journal of Polymer Science, Vol. 50, pages 511–539 (1961) which are herein incorporated by reference. The polybenzimidazoles consist essentially of recurring units of the following Formulas I and II. Formula I is:

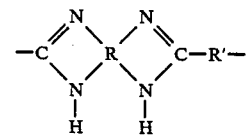

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

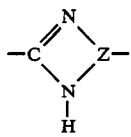

wherein Z is an aromatic nucleus having the nitrogen atoms forming the benzimidazole ring paired upon adjacent carbon atoms of the aromatic nucleus.

Preferably, aromatic polybenzimidazoles are selected from polymers consisting essentially of the recurring units of Formula I wherein R' is an aromatic ring or a heterocyclic ring and Formula II.

As set forth in U.S. Pat. No. Re. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the diphenyl ester of an aromatic dicarboxylic acid, (b) the diphenyl ester of a heteroyclic dicarboxylic acid wherein the carboxyl groups are substituents upon a carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:

poly-2,2'(m-phenylene)-5,5'-bibenzimidazole;
poly-2,2'-(pyridylene-3",5")-5,5'-bibenzimidazole;
poly-2,2'(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexenyl-5,5'-bibenzimidazole;
poly-2,2'(m-phenylene)-5,5'-di(benzimidazole) ether;
poly-2,2'(m-phenylene)-5,5'-di(benzimidazole) sulfide;
poly-2,2'(m-phenylene)-5,5'-di(benzimidazole) sulfone;
poly-2,2'(m-phenylene)-5,5'-di(benzimidazole) methane;
poly-2',2"(m-phenylene)-5',5"-di(benzimidazole) propane-2,2; and
poly-2', 2"-(m-phenylene)-5', 5"'-di(benzimidazole) ethylene-1,2 where the double bonds of the ethylene groups are intact in the final polymer.

The preferred polybenzimidazole for use in the present process is one prepared from poly-2,2'-(m-phenylene)-5,5'-bibenzimidazole, the recurring unit of which is:

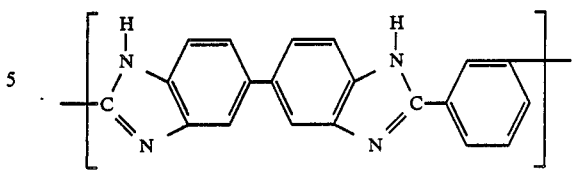

Any polymerization process known to those skilled in the art may be employed to prepare the polybenzimidazole which may then be formed into a fiber. Representative techniques for preparing the polybenzimidazole are disclosed in U.S. Pat. Nos. 3,509,108, 3,549,603, 3,551,389, 4,312,976, 4,452,971, 4,452,972, 4,483,977 and 4,485,232 which are assigned to the assignee of the present invention and are herein incorporated by reference.

With respect to aromatic polybenzimidazoles, preferably equimolar quantities of the monomeric tetraamine and dicarboxyl compound are introduced into a first stage melt polymerization reaction zone and heated therein at a temperature above about 200° C., preferably at least 250° C., and more preferably from about 270° C. to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to 0.3. The inherent viscosity (I.V.) as used herein is determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4, and preferably about 0.6 to about 1.1.

The temperature employed in the second stage is at least 250° C., preferably at least 325° C., and more preferably from about 350° to 425° C. The second stage reaction generally takes at least 0.5 hour, and preferably from about 1 to 4 hours or more. It is, of course, also possible to prepare the instant polymers via a one-step reaction. However, the previously-described two-step proces is preferred.

B. THE POLYMER SOLUTION

The solvents utilized to form the polybenzimidazole polymer solutions from which fibers are formed include those solvents which are commonly-recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethyl acetamide, N,N-dimethyl formamide, dimethyl sulfoxide, and N-methyl-2-pyrrolidone. Additional representative solvents include formic acid, acetic acid, and sulfuric acid. A particularly preferred solvent is N,N-dimethylacetamide.

The polymer solutions may be prepared, for example, by dissolving sufficient polybenzimidazole in the solvent to yield a final solution containing from about 5 to about 30 percent by weight polymer based on the total weight of the solution, and preferably from about 22 to about 26 percent by weight.

Th quantity of polybenzimidazole dissolved in the solvent should be such that the resulting solution has a viscosity of about 40 to 4,000 poises at 30° C., and preferably about 1200 to 2500 poises.

One suitable means for dissolving the polymer in the solvent is by mixing the materials at a temperature above the normal boiling point of the solvent, for example, about 25° to 120° C. above such boiling point in a closed vessel, and at a pressure of 2 to 15 atmospheres for a period of 1 to 5 hours. The resulting solutions are preferably filtered to remove any undissolved polymer.

A minor amount of lithium chloride optionally may be provided in the solution in accordance with the teachings of U.S. Pat. No. 3,502,606. Preferably, lithium chloride is present in the polymeric solution from which the filaments are made in the range of about 0.1 to about 5.0 percent based upon the total weight of the polymeric solution and most preferably about 1 to about 4 percent. The lithium chloride serves the function of preventing the polybenzimidazole polymer from phasing out of the solution upon standing for extended periods of time.

When lithium chloride is employed, preferably the spinning solution is comprised of about 22 to about 26 percent by weight of a polybenzimidazole polymer, about 70 to about 77 percent by weight solvent, and about one to about four percent by weight lithium chloride.

C. PREPARATION OF FILAMENTS

The polybenzimidazole filaments of the present invention can be prepared according to the process disclosed in U.S. Pat. No. 4,263,245 except that the solvent removal step is modified as described below or is eliminated and the filaments are not heat drawn after being dried. That patent is incorporated herein by reference.

The preferred embodiment for preparing the moldable fiber of the instant invention is depicted in FIG. 1. In FIG. 1, the spinning solution is placed in a pressure vessel, or bomb (1), and heated to approximately 110°-130° C. To spin, the solution is fed under nitrogen pressure, via line 2, to a metering pump (3) driven by a variable speed D.C. motor. In order to remove the last traces of particulate matter, the solution may be passed via line (4) to a heated candle filter (5) and via line (6) to a stainless steel sintered disc filter (7).

Next, the spinning dope is passed through spinneret (8). The spinneret is maintained at a temperature of approximately 130° to 150° C. at the time of extrusion by heating the face of the spinneret. The solution is extruded through a plurality of extrusion orifices (for example, anywhere from five to several hundred). These extrusion orifices are preferably in the form of a spinneret having five to twenty-five holes. The orifices of the present invention have a diameter of approximately 20 to 200 microns and preferably of approximately 30 to 50 microns. Generally, the polymer solution is extruded at a pressure of about 100 to 750 psi and a speed of about 5 to 50 meters per minute.

The polymer solution is extruded vertically downward at a draw ratio of about 2:1 to 50:1, preferably about 2:1 to about 10:1 and most preferably about 3:1 to about 3.5:1, into a gaseous atmosphere to form filaments (9). The gaseous atmosphere may be composed of any inert gas. Such gases include nitrogen, the noble gases, combustion gases, and air. Air is the preferred gas for the gaseous atmosphere. After extrusion, the filaments are passed over guide roll (10) and passed several times around heated skewed rolls (11) and (12) to dry the filaments prior to being collected on a bobbin (13).

In the preferred embodiment, the filaments are collected after extrusion. The filaments may be collected by any conventional means. A preferred apparatus is assembled from a D.C. motor, the speed of which can be precisely controlled, and a transverse winder adjusted so as to provide less tension during take up and to permit longer continuous operation without breaking the filaments.

Figure 2:
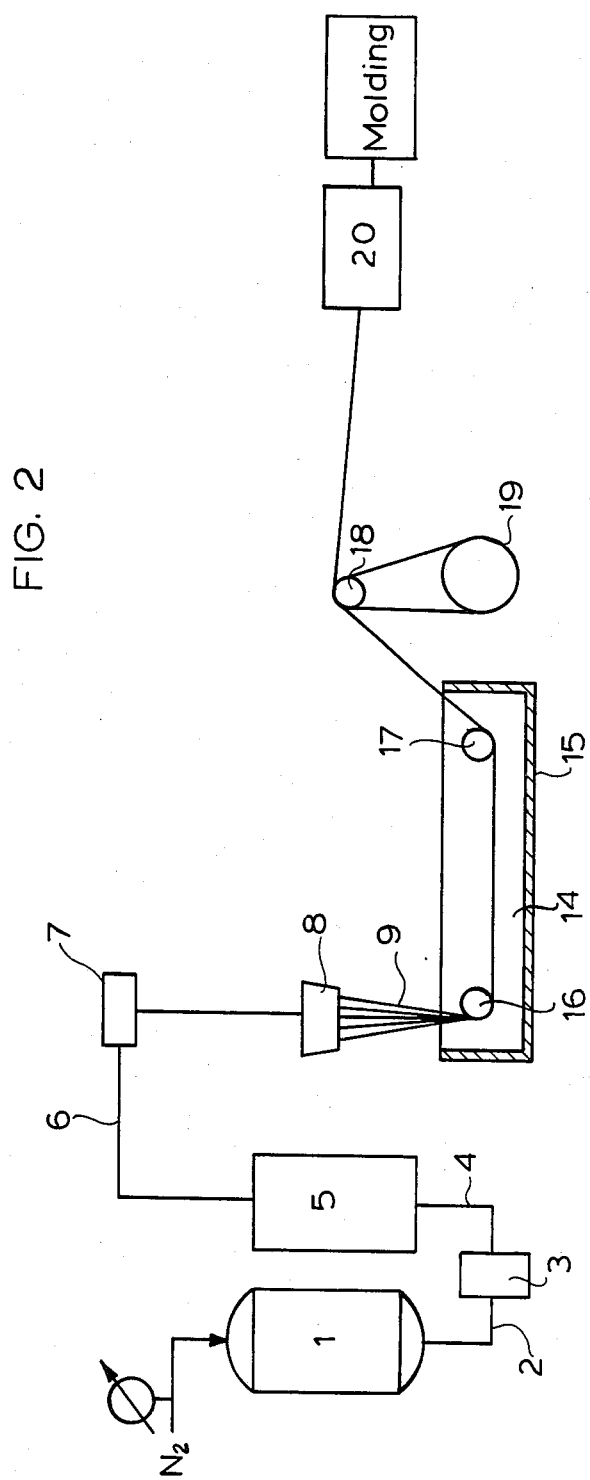
FIG. 2 is a schematic representation of an alternative embodiment for preparing the fibers of the present invention.

In a second embodiment, as depicted in FIG. 2, the extruded solution is permitted to drop freely for a short distance prior to being passed through a liquid coagulation bath (14) and then is collected. Air gaps between the face of the spinneret (8) and the coagulation bath (14) suitable for use in the present invention range from approximately ½ inch to 10 inches, and preferably from approximately 5 to 7 inches.

After dropping through the air gap, the filaments are passed through a liquid coagulation bath (14) comprising a non-solvent for the polybenzimidazole. The bath is contained in vessel or container (15). The bath preferably is water, but may also contain up to about 50 percent by weight of a polybenzimidazole solvent, preferably dimethylacetamide. The bath is preferably maintained at or near room temperature. The container (15) for the bath is preferably about one meter long. In the bath, the filaments are passed under guide rolls (16) and (17). The guide rolls can be stationary or rotating. They extend the width of the bath, and their ends are anchored by any suitable means to opposite walls of the container (15). Preferably, the fibers are maintained in the coagulation bath for a period of about one to five seconds.

In the second embodiment, the initial draw ratio is approximately 2:1 to 50:1, preferably approximately 2:1 to 10:1, and, most preferably, approximately 3:1 to 3.5:1. The coagulated fibers may be taken up and collected by any conventional means after leaving the coagulation bath. In FIG. 2, after leaving the coagulation bath, the filaments are passed several times around a pair of heated skewed rolls (18) and (19) to dry the filaments prior to collecting the filaments on bobbin (20). The number of times the filaments are wrapped around the skewed rolls determines the length of time on the rolls. Sufficient time is provided to assure that the filaments are dried before being collected. The time will depend upon the boiling point of the liquid(s) in the bath and the temperature of the heated rolls, which is generally about 100° C.

In yet a third embodiment, the coagulated fibers are passed through a washing zone after they are coagulated and before being taken up. However, it is preferred not to pass the fibers through a washing zone. If the fibers are washed, the total amount of dimethylacetamide or other solvent used in the initial polymeric solution that is left behind in the fiber must not be less than about 10 to 50 percent by weight of the total fiber weight. In other words, between about 10 to 50 percent of the final weight of the filaments is the solvent used to dissolve the polybenzimidazole.

If the fibers are washed, a simple water wash is generally employed. However, if desired, other wash materials, such as acetone, methanol, methylethyl ketone and similar solvent-miscible and volatile organic solvents may be used in place of or in combination with the water. Sufficient time is provided to assure that the filaments are dried before they are collected.

Instead of using the process described above, spun but not yet heat-set fibers can be passed through a bath of pure or diluted spinning solvent. The large surface area and the morphology of the fibers allow a rapid diffusion of the solvent into the fiber, especially when the bath is maintained at an increased temperature, but not above about 40° C.

Another method of preparing the solvent-containing fibers is to apply polybenzimidazole fibers to a mandrel and then spray the polybenzimidazole solvent onto the fibers.

Regardless of how the fibers are prepared, it is essential that the finished fibers contain from about 10 to about 50 percent by weight, preferably about 15 to about 30 percent, based on the total weight of the fiber, of the solvent from which the fiber was spun. The presence of this amount of residual solvent in the fiber allows the polybenzimidazole fibers to be readily molded.

The amount of residual solvent is determined by dissolving a portion of a polybenzimidazole filament in a solvent for polybenzimidazole other than the residual solvent. For example, when dimethylacetamide is the residual solvent, dimethylsulfoxide may be used to dissolve the filament. After the filament is dissolved, a portion of the solution containing the dissolved fiber is injected into a gas chromatograph. Based upon the size of the dimethylacetamide peak, the percent of residual solvent can be determined.

Fibers prepared according to the instant invention may be used in a wide variety of molding applications. For example, the fibers can be placed into molds to form shaped three-dimensional articles or may be applied to a mandrel and then heated so as to form a polymeric covering for the mandrel. The fibers can be continuously applied to a mandrel or mold by employing a filament winding process. The mandrel or mold is then removed after heating thereby leaving a polymeric plastic product.

The fibers can also be compression molded using conventional techniques. Generally, the fibers are compression molded at or slightly above the softening range of the polymer for from 10 to about 30 minutes to cause the fibers to melt and to flow. For the preferred polybenzimidazole polymers, this temperature will range from about 180° C. to 260° C., preferably from about 200° C. to about 225° C.

The polybenzimidazole fibers described above may be used alone or may be chopped and compounded with various fillers, extenders, reinforcing agents and the like, added to a compression mold or another type of mold and molded to produce articles having improved strength properties. Examples of such materials include titanium dioxide, fiberglass, graphite, carbon fibers, various clays and other well known products.

Since the fibers retain at least ten percent by weight solvent, they can be readily foamed. The polybenzimidazole fibers can be foamed either as chopped or continuous fibers or as a molded article (as prepared above) to produce a three-dimensional foamed article. In addition, the fibers may be ground into a powder and used in preparing foamed products. The fibers may be crushed, ground or otherwise formed into a powder or particles of small size and then stored until the powder is to be foamed.

The size of the particles will depend upon operating and processing conditions of the molding process to be used and the degree of intermixing that may be necessary with added components, such as fillers or reinforcing agents. In addition, when smaller sized foam particles are needed, it is necessary that the powder particles be of corresponding smaller size. Where the molding of intricately shaped small sized articles is desired, or where a high degree of intermixing with added reinforcing agents is required, about 40 to 100 mesh powders are employed, most preferably about 40 to 60 mesh powders.

Many methods may be employed for forming the fibers into a powder. Of course, it is necessary that the grinding process be carried out under conditions such that the solvent content of the ground particles does not fall below the minimum limits specified above, (i.e., about 10 percent by weight of solvent). The preferred grinding process for the fibers prepared according to the process of the instant invention involves chopping the fibers up into sizes of about one to two inches in length and adding the chopped fibers to a freezer mill which is surrounded by liquid nitrogen or another cooling medium such that the fibers are ultimately cooled by a medium having a low temperature, e.g., about −190° C. to about −210° C. The freezer mill can employ any of a variety of actual grinding mechanisms. Preferably the freezer mill employs ultrasonic techniques wherein a grinding device such as a metallic rod is vibrated to break up the fibers for about 5 to about 30 minutes.

The particles which result from this process are non-sintering and are stable, even ater having been stored for many months at, or even slightly above, ambient temperatures.

Prior to foaming, the polybenzimidazole powder can be placed into molds to form shaped three dimensional articles. However, it is not necessary to mold the polybenzimidazole powders and fibers of the instant invention prior to foaming. After being placed in a mold, the powder is preferably compression molded using conventional techniques and under the conditions descibed above.

The polybenzimidazole particles may also be compounded with the various fillers, extenders, reinforcing agents and the like described above and added to a compression mold or another type of mold and molded to produce articles having improved strength properties when they are subsequently foamed.

The polybenzimidazole fiber, molded article, or powder is heated to a temperature ranging from about 350° C. to about 600° C. to produce a foamed article. At a temperature at or below 250° C., the polybenzimidazole does not foam. The preferred range is about 400° C. to about 500° C. The polybenzimidazole polymer is held at the elevated temperature for approximately 30 seconds to 5 minutes. The preferred time is about 1 to about 4 minutes.

The foams and foamed articles produced by the present process are rigid and have non-burning characteristics. Consequently, the foams can be used as insulators and in fire resistant articles.

In a particularly preferred process, as disclosed in commonly assigned U.S. patent application Ser. Nos. 770,376 and 858,900, and European Patent Office Application No. 0156600, which are incorporated herein by reference, the fibers of the instant invention are blended with reinforcing fibers to form a fiber tow containing both continuous reinforcing fibers and continuous polybenzimidazole fibers.

The continuous reinforcing fibers that are useful include metallic or ceramic, amorphous, polycrystalline or single-crystal reinforcing fibers or filaments. Common examples are carbon, glass, boron and boron nitride, ceramic fibers, such as silicone carbide, silicone nitride and alumina, aramides, ordered polymers, etc. The preparation of such fibers are well known in the art and is described in the above identified patent applications.

The weight ratio of the polybenzimidazole and reinforcing fibers which are intermixed can vary widely. However, in order to prepare satisfactory composites, it is necessary that sufficient amounts of polybenzimidazole fibers be employed to obtain complete wetting of the reinforcing fibers. Generally, no less than about 30 percent, by volume, of the polybenzimidazole fibers may be employed. The maximum amount of polybenzimidazole fibers depends upon the strength properties which are required. In general, when less than about 10 percent, by volume, of the reinforcing fiber is present, the resulting composite has strength and stiffness properties which are poor in relation to products containing higher amounts of reinforcing fibers. Preferably, about 20 to 60 percent, by volume, of the reinforcing material should be present in the combined tow, and most preferably about 50 to about 60 percent.

Figure 3:
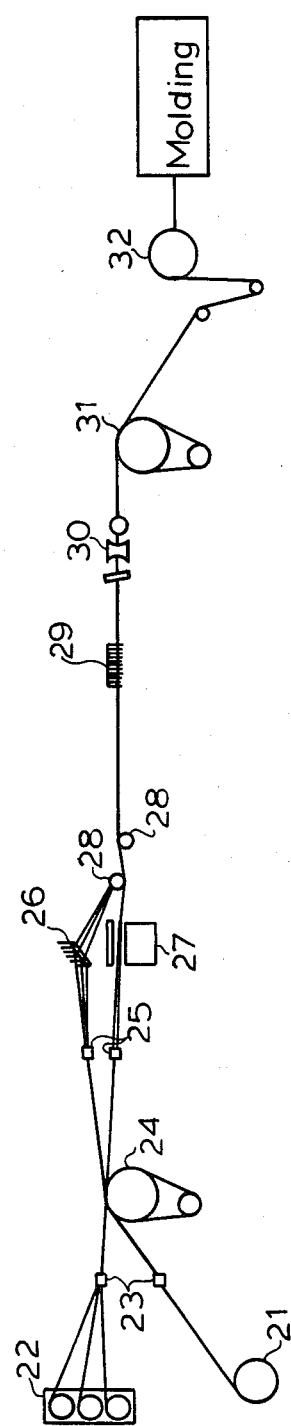
FIG. 3 depicts a process for intermixing polybenzimidazole and reinforcing fibers to form a tow suitable for preparing composite articles.

The continuous polybenzimidazole fibers and continuous reinforcing fibers can be intermixed as depicted in FIG. 3 to form a tow. Rolls or bobbins of the polybenzimidazole fibers (21) and reinforcing fibers (22) are mounted on a rack and are separately passed through a fiber guide (23) and onto a first Godet oll (24). Godet roll (24) cooperates with another Godet roll (31) at rates of speed such that the second Godet roll revolves slightly slower than the first Godet roll. Consequently, the fibers between the two Godet rolls which are subsequently spread and intermixed remain in a low tension state which provides for effective fiber intermixing. At this point in the process neither the reinforcing fibers nor the polybenzimidazole fibers are intermixed or in contact. After leaving the Godet roll (24), the respective fibers are passed separately through a fiber guide (25) to maintain directional control.

A gas banding jet (27) and/or a comb (26) is used to spread uniformly the fiber tows so as to preserve the separation of the individual fibers in the tows. Preferably, gas banding jets are used to spread both the polybenzimidazole and the reinforcing fibers. A gas banding jet can also be used later as an intermixing means whereby the gas jet serves to continuously, uniformly and intimately intermix the two fiber tows. As used herein, the term "intimately intermix" means to intermix fibers in such a manner that there is a substantially uniform distribution of fibers and the fibers are substantially parallel to one another in the resulting tow. Generally, the gas impinges in a perpendicular fashion upon the fiber tow at a pressure in the range of about 1.0 to about 2.5 psi. However, when carbon fibers are used, the pressure of the gas impinging on the carbon fibers is in the range of about 0.5 to about 1.0 psi in order to reduce damage to the fibers.

After the fibers are spread, they are continuously intermixed using any suitable intermixing means such as an air jet and/or one or more rods or rolls. In FIG. 3 the intermixing means is a set of stationary rolls or rotating rolls (28). The two tows initially come into contact together on the bottom of the first rod or roll and then are deflected across the top of the second rod or roll and are thereby intimately intermixed. It is preferred to use rotating rolls so that frictional damage to the fibers is reduced. It is necessary that intermixing be undertaken in a relatively tension free state. If high tension is imparted to either of the fiber tows, intimate (or optimal) intermixing may not occur.

In order to insure complete intermixing, it is necessary that both fiber tows be uniformly spread across their entire width prior to mixing and that the area within which both tows are spread be virtually identical. Generally, the polybenzimidazole fibers are uniformly spread to a preselected width so as to maintain the separation of the individual fibers. The reinforcing fiber tow is spread to essentially the same preselected width as the polybenzimidazole fiber tow so as to preserve the separation of the individual fibers. Unless the area between the fibers in each spread tow is virtually identical, the fibers of one tow will not fit between the space between the fibers of the other tow when the tows are brought together. As a result, complete or intimate intermixing will not occur.

After the tows are intermixed on the rolls, each fiber in the mixed tow is in a substantially parallel relationship to the other fibers in the tow and there is a substantially uniform distribution of the polybenzimidazole and reinforcing fibers in the tow. It is important that the fibers be substantially parallel to one another in the intermixed tow. If the fibers are not substantially parallel, the strength properties of the tow will be reduced because forces cannot be evenly distributed along the entire length of the fibers when the fibers are used in making composite articles.

After passing over and under the rods or rolls, the combined fiber tow may be further intermixed using an air entanglement jet as described above. The air entanglement jet does not disturb the substantially parallel relationship of the fibers in the tow. After intermixing, the combined fiber tow is passed through a comb (29) to maintain dimensional stability and through twist guide (30) to impart a slight twist to the intermixed fibers. The substantially uniform, intimately intermixed, continuous fiber tow is then wrapped around Godet roll (31) and then taken up on take-up roll (32) for storage.

The intermixed tow of the instant invention has a substantially uniform distribution of continuous polybenzimidazole and continuous reinforcing fibers, and the fibers are in a substantially parallel relationship to one another. The intimately intermixed tow may be applied to a mold or woven into a product which upon the application of that alone or of heat and pressure forms a polymeric matrix. For example, when glass or carbon fibers are used as the reinforcing fiber, the carbon or glass fibers are surrounded by a polybenzimidazole matrix.

Thus, with this process, it is possible to embed glass, carbon or other reinforcing fibers in a polybenzimidazole matrix. In the prior art it was not, and has not been, possible to obtain this type of molded product because of the difficulties in molding polybenzimidazole and the difficulties of obtaining adequate wetting of carbon and other reinforcing fibers with polybenzimidazole products.

The invention is illustrated by the following examples.

EXAMPLES

Example 1

A spinning solution containing 23 percent by weight of a poly-2,2'-(m-phenylene)-5,5'-bibenzimidazole polymer having an inherent viscosity of 0.6, 2.0 percent by weight lithium chloride and 75 percent by weight dimethylacetamide was prepared. The lithium chloride was first dissolved in the dimethylacetamide. Then the polymer was added in particulate form to the dimethylacetamide and dissolved by agitating the solution in a closed vessel at a temperature of approximately 230° C.

With reference to FIG. 2, the spinning solution was placed in a spinning bomb 1 and heated to 120° C. The spinning solution was fed via line 2 under 15 p.s.i. nitrogen pressure to a metering pump 3 driven by a variable speed D.C. motor. The spinning solution was then passed via line 4 to a heated candle filter 5 and via line 6 to a stainless steel disc filter 7. The spinning solution was extruded vertically downwardly through a spinneret 8 which was heated to 130° C. The spinnert had 5 holes, each of which had a diameter of 40 microns.

After extrusion, the polymer flow 9 was passed through a 7 inch air gap and into a 15°-25° C. water coagulation bath 14 contained in vessel 15 which was 1 meter long. A slight flow of fresh water was continuously fed into the coagulation bath to prevent a build-up of solvent during spinning. Guide rolls 16 and 17 were provided below the surface of the coagulation bath 14 to insure that the fibers remained submerged while in the bath.

The coagulated fibers leaving the coagulation bath 14, after undergoing an initial draw ratio of 3.1:1, were passed around a pair of skewed rolls 18 and 19. The bottom roll 19 was partially immersed in a bath of continuously running water maintained at a temperature of approximately 55° to 65° C. The fibers were wrapped around rolls 18 and 19 several times in order to wash the fibers free of most of the solvent. The fibers were then dried by passing them over a set of steam-heated skewed rolls and collected on bobbin 20.

The dried fibers exhibited a dimethylacetamide content of less than 5 percent by weight based upon the total weight of the fiber. The fibers were cut up into filaments one to two inches in length and ground in a freezer mil for about five minutes under liquid nitrogen at a temperature of −195° C. The resulting finely chopped polybenzimidazole fibers were well mixed with chopped carbon fibers at about a 50 percent by volume level for each fiber, based upon the total volume of all the fibers, by placing the fibers into a container which was mechanically shaken for about five to ten minutes. The carbon fibers were Celion 3000 carbon fibers, 3000 filament count, having a density of 1.7 grams/cc, a textile strength of $515 \times 10^3$ p.s.i., and a tensile modulus of $34 \times 10^6$ p.s.i. and an ultimate elongation of 1.5 percent. The carbon fiber was produced from a polyacrylonitrile precursor and is available from Celanese Specialty Operations.

The mixed fibers were placed in a 1 and ¼ inch diameter disc-shaped steel compression mold and then the mold was placed in a P-215 Pasadena Hydraulics, Inc. press. 25,000 pounds of pressure were applied, and the temperature was rapidly raised to 240° C. and held at that temperature for 30 minutes. The sample was then allowed to cool to room temperature under pressure. Examination of the resulting polybenzimidazole composite revealed that the polybenzimidazole fibers partially fused at their surfaces but did not flow enough to yield a homogeneous composite.

Example 2

Example 1 was repeated except that the polybenzimidazole fibers were dry spun. In other words, the process depicted in FIG. 1 was utilized. Unlike Example 1, the fibers were not passed through a coagulation bath or washed to remove residual amounts of dimethylacetamide. Instead, after the polymer was extruded from spinneret 8, the polybenzimidazole fibers 9 were drawn at an initial draw ratio of 3.1:1, passed under guide roll 10 and passed several times around heated skewed rolls 11 and 12 to dry the filaments prior to collecting them on bobbin 13. (See FIG. 1). The dried polybenzimidazole fiber contained approximately 40 percent by weight dimethylacetamide.

As in Example 1, the polybenzimidazole fibers were cut and mixed with chopped carbon fibers at about the fifty percent by volume level and molded. However, in this example, the polybenzimidazole fibers melted and flowed when heat and pressure were applied, yielding a molded, homogeneous article comprised of carbon fibers embedded in a polybenzimidazole matrix.

The molded article was subsequently foamed by placing the article in a porcelain dish and then exposing it to a temperature of 400° C. in a furnace at ambient pressure for about three minutes. The resulting three-dimensional foamed article had non-burning characteristics The examples demonstrate that if the amount of residual solvent in the polybenzimidazole fibers is not high enough, it is not possible to make homogeneous composites from the fibers. The examples also demonstrate that foamed articles may be prepared from the fibers.

What is claimed is:

1. A moldable polybenzimidazlole filament containing from about 10 to about 50 percent by weight of a solvent for the polybenzimidazole polymer.

2. The filament of claim 1 wherein said polybenzimidazole polymer consists essentially of recurring units of the formula:

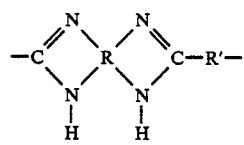

wherein R is a tetravalent aromatic nucleus, with the nitrogen atoms forming the benzimidazole rings paired upon adjacent carbon atoms of said aromatic nucleus, and R, is selected from the group consisting of (1) an aromatic ring, (2) an alkylene group having from four to eight carbon atoms, and (3) a heterocyclcic ring selected from the group consisting of (a) pyridine, (b) pyrazine, (c) furan, (d) quinoline, (e) thiophene, and (f) pyran.

3. The filament of claim 1 wherein the polybenzimidazole polymer consists essentially of the recurring units of the formula:

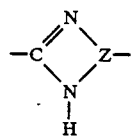

wherein Z is an aromatic nucleus having the nitrogen atoms forming the benzimidazole ring paired upon adjacent carbon atoms of the aromatic nucleus.

4. The filament of claim 1 wherein said polybenzimidazole polymer is poly-2,2'-(m-phenylene)-5,5'-bibenzimidazole.

5. The filament of claims 1, 2, 3 or 4 wherein said solvent is selected from the group consisting of N,N-dimethylacetamide, N,N-dimethyl formamide, dimethylsulfoxide, N-methyl-2-pyrrolidone and concentrated sulfuric acid.

6. The filament of claims 1, 2, 3 or 4 wherein said solvent is N,N-dimethylacetamide.

7. The filament of claims 1, 2, 3 or 4 wherein said percent by weight solvent in the filament is about 15 to about 30 percent.

8. A process for the preparation of polybenzimidazole molded products comprising:
   (a) preparing a spinning solution containing polybenzimidazole dissolved in a solvent;
   (b) extruding said spinning solution to form a plurality of filaments;
   (c) collecting and maintaining said filaments with a solvent content of about 10 to about 50 percent by weight based on the total weight of the solvent and the filaments; and
   (d) forming the filaments into a molded article at a temperature below the foaming temperature of the polybenzimidazole.

9. A process for the preparation of moldable polybenzimidazole filaments which comprises:
   (a) preparing a spinning solution containing polybenzimidazole dissolved in a solvent;
   (b) extruding said spinning solution vertically to form a plurality of filaments; and
   (c) collecting and maintaining said filaments with a solvent content of about 10 to about 50 percent by weight based on the total weight of the solvent and the filaments.

10. A process for forming a composite article which comprises applying to a mold an intimately intermixed, continuous tow of substantially parallel filaments in a substantially uniform distribution containing a mixture of about 90 to about 30 percent by volume, based on the total filament content, of continuous, individual, polybenzimidazole filaments and about 10 to about 70 percent by volume, based on the total filament content, of continuous, individual non-thermoplastic reinforcing filaments, and heating the tow to a temperature above the melting point of the polybenzimidazole filaments but below their foaming temperature wherein said polybenzimidazole filaments contain from about 10 to about 50 percent by weight of a solvent for the polybenzimidazole polymer.

11. The process of claim 10 wherein the intimately intermixed filament tow is prepared by:
   (a) forming a continuous tow of continuous non-thermoplastic reinforcing filaments;
   (b) forming a continuous tow of continuous polybenzimidazole filaments having a solvent content of about 10 to about 50 percent by weight based upon the total weight of the solvent and the filaments;
   (c) uniformly and continuously spreading the polybenzimidazole filament tow;
   (d) uniformly and continuously spreading the non-thermoplastic reinforcing filament tow;
   (e) intimately, uniformly and continuously intermixing the spread, non-thermoplastic filament tow and the spread, polybenzimidazole tow such that there is provided a substantially parallel and a substantially uniform distribution of the polybenzimidazole filaments and the non-thermoplastic filaments within an intimately intermixed tow; and
   (f) continuously withdrawing the intimately intermixed tow.

12. The process of claims 1, 2, 3 or 4 wherein said polybenzimidazole polymer consists essentially of recurring units of the formula:

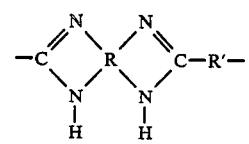

wherein R is a tetravalent aromatic nucleus, with the nitrogen atoms forming the benzimidazole rings paired upon adjacent carbon atoms of said aromatic nucleus, and R' is selected from the group consisting of (1) an aromatic ring, (2) an alkylene group having from our to eight carbon atoms, and (3) a heterocyclic ring selected from the group consisting of (a) pyridine, (b) pyrazine, (c) furan, (d) quinoline, (e) thiophene, and (f) pyran.

13. The process of claims 1, 2, 3 or 4 wherein said polybenzimidazole polymer consists essentially of the recurring units of the formula:

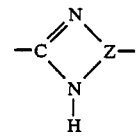

wherein Z is an aromatic nucleus having the nitrogen atoms forming the benzimidazole ring paired upon adjacent carbon atoms of the aromatic nucleus.

14. The process of claims 8, 9, 10 or 11 wherein said polybenzimidazole polymer is poly-2,2'-(m-phenylene)-5,5'-bibenzimidazole.

15. The process of claims 8, 9, 10 or 11 wherein said solvent for said polybenzimidazole is selected from the group consisting of N,N-dimethylacetamide, N,N,-dimethyl formamide, dimethyl sulfoxide, N-methyl-2-pyrrolidone and concentrated sulfuric acid.

16. The process of claims 8, 9, 10 or 11 wherein said solvent is N,N-dimethylacetamide.

17. The process of claims 8, 9, 10 or 11 wherein said solvent content is in the range of about 15 to about 30 percent by weight.

18. The process of claims 8 or 9 wherein said spinning solution is extruded at a temperature of approximately 130° to 150° C.

19. The process of claims 8 or 9 wherein said extruded filaments are initially drawn at a ratio of approximately 2:1 to 50:1.

20. The process of claim 19 wherein said extruded filaments are initially drawn at a ratio of approximately about 2:1 to 10:1.

21. The process of claims 8 or 9 wherein said filaments are coagulated in a coagulation bath after extrusion.

22. The process of claim 21 wherein said coagulation bath comprises water.

23. The process of claim 22 wherein said coagulation bath conrains up to about 50 percent by weight dimethylacetamide.

24. The process of claim 22 wherein said filaments are washed after being coagulated in said coagulation bath and prior to being collected.

25. The process of claim 24 wherein said filaments are washed with water.

26. The process of claims 8 or 9 wherein said molded by a process involving the steps of chopping the filaments, placing the filaments in a mold, and molding the filaments.

27. The process of claims 8, 9 or 10 wherein said filaments are continuously applied to a mandrel by employing a filament winding process and heated on said mandrel so as to form a molded article.

28. The process of claims 10 or 11 wherein said non-thermoplastic filaments are selected from the group consisting of non-thermoplastic glass, carbon, metallic, ceramic, amorphous, and polycrystalline filaments.

29. The process of claim 10 wherein the tow contains about 20 to about 60 percent by volume based upon the total filament content of reinforcing filaments.

30. The process of claim 29 wherein the tow contains about 50 to about 60 percent of reinforcing fibers.

31. The process of claims 8 or 9 wherein said spinning solution is comprised of about 5 to about 30 percent by weight of a polybenzimidazole polymer and about 70 to about 95 percent by weight of dimethylacetamide.

32. The process of claim 31 wherein said spinning solution is comprised of about 22 to about 26 percent by weight of a polybenzimidazole polymer, about 1 to about 4 percent by weight of lithium chloride and about 70 to about 77 percent by weight of dimethylacetamide.

33. The process of claim 9 wherein after said filaments are extruded but before said filaments are heat-set, said filaments are passed through a bath of pure or diluted spinning solvent.

34. The process of claim 27 wherein said filaments are sprayed with solvent prior to being heated.

35. The process of claim 34 wherein said solvent is dimethylacetamide.

36. The process of claim 8 wherein water the filaments are molded, the resulting molded product is heated at a temperature in the range of about 350° C. to about 600° C. to form a foamed article.

37. The process of claim 29 wherein the temperature is in the range of about 400° C. to about 500° C.

38. The process of claim 10 wherein the composite article is heated at a temperature in the range of about 350° C. to about 600° C. to form a foamed article.

39. The process of claim 38 wherein the temperature is in the range of about 400° C. to about 500° C.

40. The process of claim 11 wherein the filaments are intermixed by employing a gas intermixing means.

41. The process of claim 40 wherein the gas intermixing means comprises a gas box having a gas impingement means which 42. The process of claim 11 wherein the filaments are intermixed by bringing the fibers into simultaneous contact onto a first roll or rod.

43. The process of claim 42 wherein the fibers are sequentially brought into contact with the first rod or roll and then a second rod or roll.

* * * * *